United States Patent
Loce et al.

(10) Patent No.: US 7,764,403 B2
(45) Date of Patent: Jul. 27, 2010

(54) WATERMARKING

(75) Inventors: Robert P. Loce, Webster, NY (US); Raja Bala, Webster, NY (US); Karen M. Braun, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 841 days.

(21) Appl. No.: 11/634,657

(22) Filed: Dec. 6, 2006

(65) Prior Publication Data

US 2008/0137149 A1 Jun. 12, 2008

(51) Int. Cl.
*H04N 1/40* (2006.01)
*H04N 1/60* (2006.01)

(52) U.S. Cl. ................ 358/3.28; 358/1.9

(58) Field of Classification Search .......... 358/3.28, 358/1.1, 1.9, 517, 518, 519, 520, 1.15, 1.18; 235/494; 283/113, 114, 902; 382/100, 135, 382/137, 165, 162; 356/71, 402; 340/815.56, 340/815.65, 5.86; 380/55; 705/62, 57
See application file for complete search history.

(56) References Cited

U.S. PATENT DOCUMENTS

| | | | |
|---|---|---|---|
| 5,870,530 | A | 2/1999 | Balasubramanian |
| 5,892,891 | A | 4/1999 | Dalal et al. |
| 6,307,645 | B1 | 10/2001 | Mantell et al. |
| 6,721,440 | B2 * | 4/2004 | Reed et al. ............ 382/100 |
| 7,070,252 | B2 | 7/2006 | de Queiroz et al. |
| 2001/0054150 | A1 * | 12/2001 | Levy ............... 713/176 |
| 2003/0058477 | A1 * | 3/2003 | Brunk et al. .......... 358/3.28 |
| 2005/0041051 | A1 * | 2/2005 | de Queiroz et al. ...... 347/15 |
| 2005/0041832 | A1 | 2/2005 | Queiroz et al. |

OTHER PUBLICATIONS de Queiroz, et al., *Spatially Varying Gray Component Replacement For Image Watermarking*, 2005 IEEE, pp. I-385-I-388.
de Queiroz, et al. Detecting spatially varing gray component replacement with application in watermarking printed images, *Journal of Electronic Imaging* 14(3), 033016 (Jul.-Sep. 2005), pp. 1-9.

* cited by examiner

Primary Examiner—Dov Popovici
(74) Attorney, Agent, or Firm—Fay Sharpe LLP

(57) ABSTRACT

Extended colorant sets are used to hide data or provide a watermark in printed images. Extended set colorants are colorants other than, and in addition to, the standard or common subtractive primary colorants: cyan, magenta, yellow and/or black. Where the extended colorant set supports a plurality of colorant recipes for rendering a given color, watermark data is used to select a colorant recipe from the plurality. As the watermark data to be encoded in the image changes state with image position, alternate colorant recipes or colorant selection functions are selected. The image is rendered based on the alternate colorant recipe selections. Watermark information is encoded in the colorant recipe or colorant selection function selection. Use of the extended colorant sets allows information to be encoded even in portions of an image having colors that do not include a neutral component.

21 Claims, 2 Drawing Sheets

WATERMARKING

BACKGROUND

The present illustrative embodiments are related to methods and systems for providing a watermark in a printed version of an image. The systems and methods provide at least one augmenting or additional colorant in addition to the typical customary, common or ordinary subtractive primary colorants (i.e., cyan, yellow, magenta and/or black primary colorants). The additional or augmenting colorants are atypical, uncommon or extended set colorants (i.e., not full load cyan, magenta, yellow or black). Increasing the number of available colorants increases the number of colors for which alternative colorant recipes can be found. Watermark information is used to select between alternate colorant recipes or colorant selection functions. For the most part, embodiments will be described in terms of systems that include the four subtractive primary colorants. However, embodiments can readily be adapted for systems that use other or fewer primary colorants. For example, an embodiment adapted for black and white imaging systems can include a means for providing a low-load black or gray colorant in addition to a customary or common subtractive black colorant.

There are many reasons for hiding data or providing a watermark in an image. Watermarks or hidden information are provided in printed documents to provide a method for authenticating a document. For example, many bank checks and/or negotiable securities include watermarks in order to combat fraud and counterfeiting. Additionally, watermarks are provided in images as a means for covert communication. Watermarking can also be used to provide information regarding the watermarked image or document.

For example, U.S. Pat. No. 7,070,252 B2 to de Queiroz, et al., which issued Jul. 4, 2006, describes selecting between gray color replacement (GCR) techniques to encode rendering hints or tags, for guiding the reproduction of copies of the image, in printed versions of the image.

Proportional amounts of the subtractive primary colorants, cyan, magenta and yellow, combine to absorb all of the wavelengths of the visible spectrum. Accordingly, when a colorant recipe for producing a color calls for respective amounts of cyan, magenta and yellow colorants, some fraction of those respective amounts can be replaced with a respective proportional amount of black colorant. Taking advantage of this phenomenon is referred to as gray component replacement (GCR). When this phenomenon is fully taken advantage of, i.e., when the entire neutral, gray or black component of a combination of cyan, magenta and yellow colorants is replaced with a black colorant, the strategy is referred to as 100% GCR. When none of the respective amounts of cyan, magenta and yellow colorants are replaced with black colorant, the strategy is referred to as 0% GCR. Fractional GCR strategies (e.g., 25%, 50%, 75%) may also be applied. Accordingly, where a color includes a neutral or gray component, and as described by de Queiroz, et al., the color can be rendered according to any selected GCR strategy. Where the GCR strategy is selected according to spatially varying watermark information, the varying GCR selections encode the watermark information in a rendered version of the image.

However, encoding by GCR strategy selection is limited to those portions of an image that have colors that include a neutral component.

There has been a desire for systems and methods for providing encoded information or watermarks that can be applied to portions of an image that do not include useful neutral components.

INCORPORATION BY REFERENCE

U.S. Pat. No. 7,070,252 B2 to de Queiroz, et al. which issued Jul. 4, 2006, which may be of interest, is included herein by reference for all it discloses.

BRIEF DESCRIPTION

A method for providing a watermark in an image can include augmenting an available customary subtractive primary colorant set with at least one additional extended set colorant, receiving color designation information regarding an element of the image, determining an iso-color locus of colorant recipes for rendering a color described in the color designation information wherein at least one of the colorant recipes in the locus of colorant recipes calls for a non-zero amount of at least one of the at least one additional colorant, selecting at least two of the determined iso-color colorant recipes, wherein at least one of the selected determined iso-color colorant recipes specifies a non-zero amount of at least one of the at least one additional colorant, associating the at least two selected recipes with at least two respective encoded information states, thereby establishing an address for each selected recipe, receiving state information to be encoded in a printed version of the element of the image and preparing to print a representation of the color described in the color designation information of the element of the image according to the colorant recipe addressed by the received state information.

A document processing system that is operative to perform the method can include at least one printer model regarding a designated printer, wherein the designated printer includes: at least one primary colorant applicator that is operative to apply at least a standard subtractive primary colorant set and at least one augmenting colorant applicator that is operative to apply at least one additional extended set colorant beyond the customary subtractive primary colorant set. In some embodiments the primary colorant applicator may also serve as the at least one augmenting colorant applicator. The system may also include an image data receiver, an iso-color locus determiner, an iso-color recipe selector, a watermark receiver and a rendering module.

For example, the image data receiver can be operative to receive color designation information regarding an element of an image.

The iso-color locus determiner can be operative to determine an iso-color locus of colorant recipes for rendering a color described in the color designation information wherein at least one of the colorant recipes in the locus of colorant recipes calls for a non-zero amount of at least one of the at least one additional colorant;

The iso-color recipe selector can be operative to select at least two of the determined iso-color colorant recipes, wherein at least one of the selected determined iso-color colorant recipes specifies a non-zero amount of at least one of the at least one additional colorant and to associate the at least two selected recipes with at least two respective encoded information states, thereby establishing an address for each selected recipe;

The watermark receiver receives state information to be encoded in a rendered version of the element of the image and the rendering module prepares to print a representation of the color described in the color designation information of the element of the image according to the colorant recipe addressed by the received state information.

DETAILED DESCRIPTION

Figure 1:
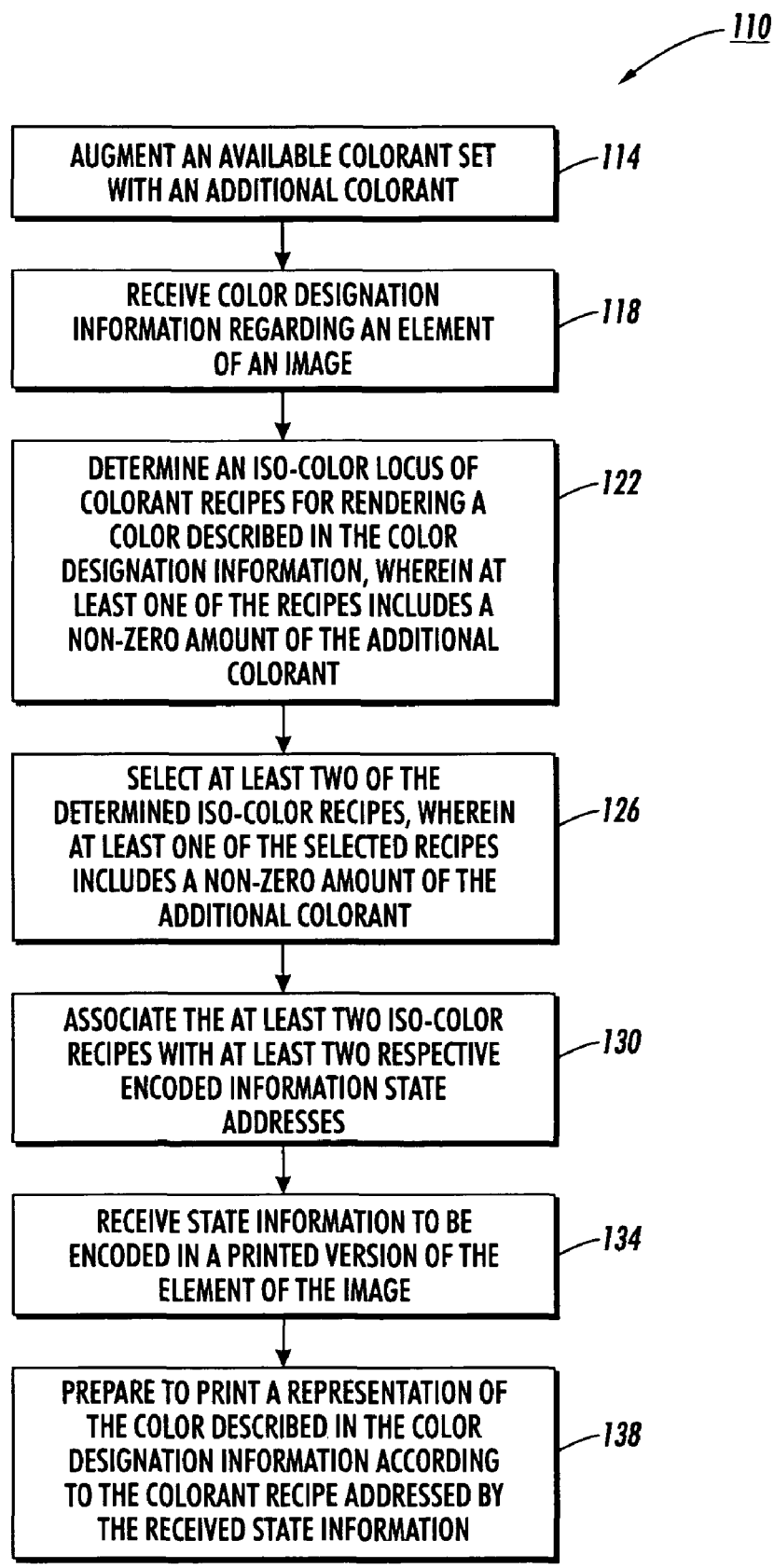
FIG. 1 is a flow chart outlining a method for providing a watermark in an image.

Referring to FIG. 1, a method 110 for providing a watermark can include augmenting 114 an available colorant set with an additional colorant, receiving 118 color designation information regarding an element of an image and determining 122 an iso-color locus of colorant recipes (i.e., calorimetrically matched, or approximately matched, colorant recipes) for rendering a color described in the color designation information. When there are at least two colorant recipes in the iso-color locus and when at least one of the colorant recipes specifies a non-zero amount of the additional colorant, the method 110 can be used to provide a watermark even when the color described in the color designation information does not include a significant or usable neutral component (i.e., where GCR strategy selection cannot be used to provide the watermark or to encode information).

The method 110 further includes selecting 126 at least two of the determined iso-color recipes. If it is desired to encode the information without relying on GCR strategy selection, at least one of the selected 126 recipes should call for a non-zero amount of the additional colorant. The selected recipes are then associated 130 with at least two respective encoded information states. The associated encoded information states act as an address or index for addressing or selecting their respective associated colorant recipes.

Accordingly, when state information to be encoded in a rendered or printed version of the element of the image is received 134, preparations 138 can be made to print a representation of the color described in the color designation information according to the colorant recipe addressed or indexed by the received state information.

Augmenting 114 the available colorant set includes augmenting a typical, common, ordinary or customary colorant set. For example, as used herein, typical, common, ordinary and customary refer to full-load or full density colorants, such as full-load cyan, magenta, yellow and/or black colorants, that are included in most common electrophotographic (or xerographic), inkjet and offset printing environments. This customary colorant set can be augmented 114 with a wide variety of atypical, uncommon or extended set colorants (i.e., any colorant other than a full-load cyan, magenta, yellow and/or black colorant).

For example, the augmenting 114 or additional colorant can be a low-load colorant. For instance, printers can be adapted to provide or apply a low-density or low-load colorant. For example, a black and white printer, which is adapted to apply or provide a black (K) colorant, may be adapted to also apply a low-load black colorant (k), or gray colorant. Accordingly, in such systems, a given shade of gray can be represented by a midrange-value or amount of the ordinary black colorant or a relatively higher value of the atypical, low-load black, or gray colorant, or by a combination of reduced amounts of both the black and gray colorants.

Additionally, or alternatively, in color printing environments, augmenting 114 low-load or low-density cyan, magenta and yellow colorants may be provided.

As a group, colorants such as the low-load or low-density colorants discussed above are one type of extended set colorants. Other kinds of extended set colorants include spectrally extended colorants.

Spectrally extended colorants include those colorants that are spectrally different from the typical, customary, ordinary or common (i.e., CMY and/or K) colorants. For example, Hi-Fi colorants, such as orange (O), green (G), red (R), blue (B), violet (V), green violet (GV) and turquoise (T) colorants, are referred to as spectrally extended colorants. Other colorants are also included in the spectrally extended colorant classification. For instance, metallic colorants, such as gold and silver, may be referred to as spectrally extended colorants.

Augmenting 114 the available colorant set can include augmenting 114 the available colorant set with one or more extended and/or spectrally extended set colorant. Furthermore, augmenting 114 the available colorant set with an additional colorant can include augmenting the available colorant set with an extended set or spectrally extended set fluorescent colorant. As used herein, fluorescent colorants include colorants that absorb ultraviolet (UV) radiation and re-emit that energy in the visible spectrum. In the absence of UV, these colorants can be extended set colorants (i.e., are perceived as cyan, magenta or yellow) or spectrally extended set colorants (i.e., are not perceived as cyan, magenta or yellow).

Receiving 118 color designation information regarding an element of an image can include receiving a color description regarding a single picture element (pixel). Alternatively, receiving 118 color designation information can include receiving color information regarding a plurality of pixels including, for example, a cluster of pixels forming a regular geometric shape such as a five-pixel by five-pixel square or array, a cluster of pixels defining an object depicted in the image or a region defined in some analytical form, such as a Page Description Language (PDL) Markup Language representation of an object. For instance, the received 118 color designation information can be in the form of machine independent or machine dependent color descriptions. For instance, the color designation information can be received 118 in the form of sRGB, CIELab, swopCMYK, and/or gray/luminance information. A cooperative of companies developed standard RGB (sRGB) as a machine-independent color space for use on the internet. CIELab refers to a machine-independent color space of the international commission on illumination (Commission Internationale d'Eclairage). The specification for web offset publications (SWOP) refers to a specific set of CMYK printing inks (SWOP CMYK). Accordingly, a color can be described in terms of relative amounts of those inks. Gray/luminance information can be used to describe, for example, black and white images or image elements thereof. Additionally, color designation information can be received 118 in the form of, for example, machine-dependent contone values based on a calibration of an associated printing device. The color designation information can be received 118 in terms of the augmented 114 colorant set (i.e., including the additional colorant or colorants) or in terms of the unaugmented standard or common set of colorants. In whatever form it is received, the color description can be transformed into any other convenient or useful color description form.

Determining 122 an iso-color locus of colorant recipes for rendering a color described in the color designation information can include applying one or more printer models (see FIG. 2) and/or one or more colorant selection functions (CSF) to determine or predict colorant recipes or combinations or mixtures of available colorants for rendering or printing the color described in the color designation information.

Figure 2:
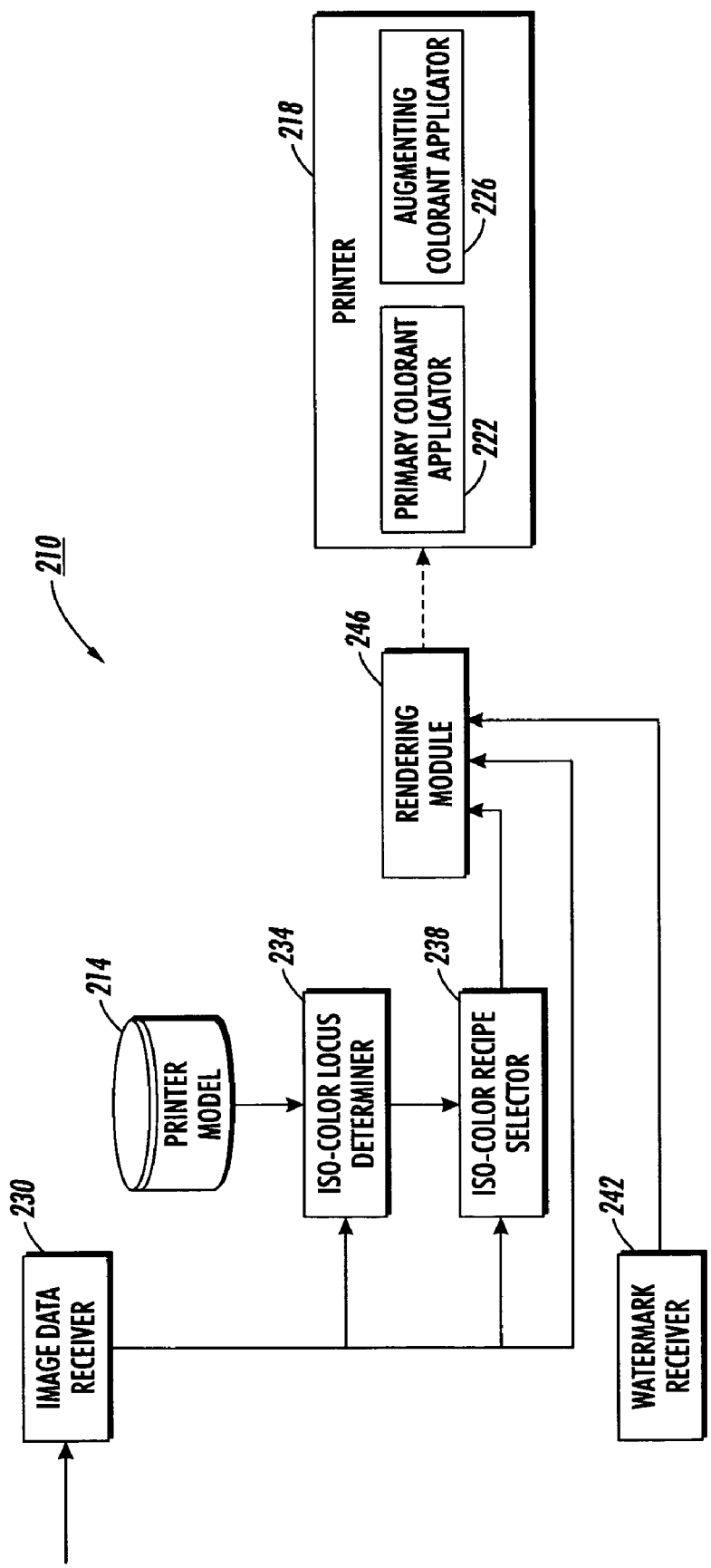
FIG. 2 is a block diagram of a system or system portion that is operative to perform the method of FIG. 1

For instance, color patches based on various combinations of the available colorants are rendered (e.g., through a selected halftoning or error diffusion technique) with an associated printer (see FIG. 2). Color measurements are made of the rendered test patches. Measured values are stored in association with the colorant recipes of the patches for which the measurements were made. This information is used to characterize the color production behavior of the associated marking engine or printer. One or more models are derived from this information so that for a given color description, one or more colorant recipes for producing, generating or representing that color can be predicted or determined.

For instance, colorant selection functions (CSF) based on the printer model or models and respective colorant selection strategies or constraints are determined. For example, a first CSF may seek to minimize an amount of one or more standard, ordinary, customary or typical colorant (C, M, Y, K) that is included in a recipe. A second CSF may select or predict colorant recipes that maximize an amount of one or more of the ordinary or customary colorants included in a recipe for the given color description. Still other CSFs may seek to maximize and/or minimize an amount of an augmenting additional extended set colorant included in a recipe for the given color description.

Accordingly, determining 122 an iso-color locus of colorant recipes for rendering the color described in the color designation information can include predicting or determining all of the possible colorant recipes for representing the color described in the color designation information (within some acceptable error) and sorting or ranking the predicted recipes according to predetermined colorant selection strategies. Alternatively, the colorant selection strategies and color production behavior information are parameterized and provided in the form of predetermined colorant selection functions (CSFs). Accordingly, determining 122 the iso-color recipes can include pre-calculation and storage of colorant recipes according to pre-selected (126) CSFs before any particular color designation information is received 118. For instance, colorant recipes for selected colors are pre-calculated according to pre-selected (126) CSFs and are stored in look-up tables (LUTs) or other data storage structures associated with the CSFs. The association 130 of recipes with information states can then be an association 130 of information states with the LUTs or other data storage structures.

It may be that for a given color description, none of the elements of the iso-color locus or colormetrically matched colorant recipes include any of the augmenting additional colorant. However, to encode information or provide a watermark without relying on a neutral component of a described color, the determined 122 iso-color locus should include at least one recipe that calls for a non-zero amount of at least one of the additional colorant or colorants. Accordingly, where such an iso-color locus is available, selecting 126 at least two of the determined iso-color recipes includes selecting at least one recipe that includes a non-zero amount of at least one of the additional colorant or colorants.

The number of recipes selected depends on the complexity of the information to be encoded in the image. For example, if a binary watermark is to be encoded, then only two colorant recipes need to be selected 126. That is, a respective colorant recipe is selected to represent each of the respective binary states (0 and 1) to be encoded in the image. If each element of the image is to encode more than one bit of information, then additional iso-color recipes are selected 126. For example, if two bits of information (i.e., four states) are to be encoded in each element of an image, then only colors for which at least four colorant recipes are available can be used to encode information, and four recipes are selected 126 for encoding the information.

For instance, the recipes are selected 126 on the basis of an optimization or tradeoff between how well hidden the information will be and a degree of difficulty associated with decoding the hidden information. Additionally, the recipes may be selected 126 on the basis of an optimization related to a desired or available decoding technique.

For instance, it may be easier to detect a difference, and, therefore, encoded information, between recipes that include a maximum amount of the additional colorant and recipes that include none of the additional colorant. However, such recipe selections 126 may result in a noticeable and visually displeasing texture being manifest in a printed version of the image. Accordingly, while it may be more difficult to detect or decode differences between recipes that include various percentages of a maximum amount of the additional colorant, colorant recipes may be selected 126 to reduce displeasing or apparent textural distortions while maintaining an appropriate level of detectability or decodability. Indeed, the increased difficulty in detectability of such colorant recipe selections may be desirable in applications where the watermark is used to provide a means for covert communications.

In the following discussion of methods of determining 122 iso-color loci of colorant recipes (i.e., calorimetrically match (within some tolerance) recipes), bold face terms represent vectors and plain type terms represent scalar values. Additionally, in the following discussion:

c refers to a multi-dimensional vector describing the appearance of a printed color under a normal viewing illuminant. We will also assume the received 118 color designation includes a color described in terms of such a color space.
Example: c=[L,a,b]

x refers to an n-dimensional vector describing digital colorant values that might be sent to an associated printer
Examples: x=[C, M, Y, K]; x=[c, C, m, M, Y, K]; x=[C, M, Y, K, O](c, m refer to low-load extended set colorants)

d refers to the output of some watermark decoder.
Examples:
1) If the decoding is to be done by viewing the print with a special illuminant/filter, d might be a 3-D vector describing perceived color under these conditions.
2) If the decoding is done via a scanner, then d might represent the output of decoding logic associated with the scanner, such as a spatial texture metric f( ) refers to a printer model that maps colorants x to perceived color c. As indicated above, printer models are typically derived empirically. For example, printer models are derived by fitting higher order nonlinear functions (e.g. polynomials, splines, neural networks, Neugebauer models) to empirical data (e.g., test patch measurements and associated recipes). An inverse function (i.e., $f^{-1}(\ )$) maps an input image element described color c to colorant amounts x. Techniques such as neural networks, polynomial fitting, weighted regression, splines can be used to derive the inverse function. For 4 or more colorants, $f^{-1}(\ )$ is a one-to-many mapping, i.e. there can be multiple colorant selection functions (CSFs) for a given input c.

g( ) refers to a function that relates colorants x to some output d of the watermark decoder.

$E_f(c_1, c_2)$ refers to a distortion metric describing a perceived difference between two printed colors under normal viewing conditions Example:

$E_f = \Delta E^*_{ab}(c_1, c_2)$ for normal (e.g. D50) illuminant, where $\Delta E^*_{ab}(c_1, c_2)$ indicates the straight-line Euclidean distance between two colors $c_1 = [L^*_1, a^*_1, b^*_1]$ and $c_2 = [L^*_2, a^*_2, b^*_2]$.

$E_g(d_1, d_2)$ refers to a distortion metric describing a difference between two decoder outputs.

Example:

in a hi-fi case employing, for example, orange as the augmenting 114 colorant, g( ) could predict the color perceived under a special illuminant designed to be sensitive to the spectral characteristics of the orange colorant, and $E_g = \Delta E^*_{ab}(c_1, c_2)$ computed under this illuminant.

Iso-Color Formulation:

Let us say we wish to insert a binary (two-level) watermark in an image region or element deemed capable for watermark insertion. Assume for ease of illustration that this region includes a single color c. We wish to find two colorant combinations $x_1, x_2$ such that the following conditions hold:

$$E_f(c, f(x_1)) < T_1 \quad \text{(i)}$$

$$E_f(f(x_1), f(x_2)) < T_2 \quad \text{(ii)}$$

$$E_g(g(x_1), g(x_2)) > T_3 \quad \text{(iii)}$$

$T_1, T_2, T_3$ are thresholds that trade off the visibility of the watermark under normal viewing conditions (i and ii) vs. the visibility of the watermark to the decoder (iii). They are derived via experimentation. E.g. $T_1, T_2$ could be 2 $\Delta E^*_{ab}$. $T_3$ would likely depend on the type of decoder and/or decoding technique used.

The first condition says we want the print to reproduce the desired color c within a given tolerance $T_1$. That is, $x_1$ will produce, within some tolerance, the requested color c when printed and viewed under normal conditions. This is essentially finding a suitable CSF or $f^{-1}(c)$.

The second condition says $x_1$ and $x_2$ will produce the same color under normal conditions, within some tolerance $T_2$. This is essentially finding a second CSF for the same requested color c. Note that $x_1$ plus the set of all colors that satisfy (ii) forms the iso-color locus for color c.

The third condition says $x_1$ and $x_2$ will produce sufficient difference in decoder output that the watermark can be reliably extracted.

Accordingly, one way to determine 122 an iso-color locus of colorant recipes and to select 126 recipes is to find $x_1$ that solves (i) using printer model inversion techniques, and then to find $x_2$ that minimizes the color error $E_f$ in (ii) subject to a decoder constraint (iii).

Another way to determine 122 an iso-color locus and select 126 recipes is to find $x_i$ that solves (i) as before, and then find $x_2$ that maximizes decoder difference $E_g$ in (iii) subject to a color matching constraint (ii).

There are several ways to implement (i)-(iii). One approach is as follows.

For a given requested color c, apply an inverse function $f^{-1}$ (or CSF) via a printer inversion technique to obtain $x_1$.

Find the rest of the points on the iso color-locus via an intelligent search technique, which starts with the solution to (i), applies local perturbations to this to find another solution that satisfies (ii), and continues in this fashion until all or a sufficient number of points have been found.

Apply a suitable decoder and difference function to select two points from the iso-color locus that satisfy (iii). It is anticipated that the decoder function go could be complicated to compute. A simple estimate for g( ) could be the strength of one or more of the special colorants. E.g. if we are designing a hi-fi color system with Orange (O) as the augmenting 114 colorant, we might choose g( ) to simply return the O colorant amount, and $E_g = O_1 - O_2$. So we select 126 two points on the iso-color locus that are sufficiently different in Orange amount to be detected.

As indicated above, each of the selected 126 colorant recipes is associated 130 with an encoded information state. That is, for example, one colorant recipe (or CSF or set of recipes stored in a LUT or other structure) is associated with an encoded information state of 0 and a second colorant recipe (or CSF or set of recipes stored in a LUT or other structure) for the color described in the color designation information is associated with a value of 1. Other colorant recipes (or CSFs or sets of recipes stored in a LUT or other structure) can be associated with a value of 2, a value of 3 and additional values dependent only on the number of information states desired to be encoded in a given image element, the number of colorant recipes available for a given color description associated with the image element and an ability of the decoding system or method to discriminate between different colorant recipes or colorant recipe selection strategies or functions (CSF).

State information is received 134 and is treated as an address or index. That is, the colorant recipe that is associated with the received 118 color designation information and that was associated 130 with the encoded information state that matches or corresponds to the received 134 state information is used in the preparation 138 to print the representation of the color described in the color designation information. For instance, the addressed colorant recipe includes machine-dependent contone values for rendering the color described in the colorant designation information. Where LUTs or other data structures are used to pre-store selected recipes the received 134 state information is used to select or address the data structure and interpolation or other techniques may be used to determine the colorant recipe or set of contone values that is associated with the received 118 color designation information. Those contone values are processed to make one or more marking decisions. For example, the contone values may be processed with one or more halftone screens. The contone values are compared to threshold values in the screen that correspond to a spatial position of the image element. One or more marking decisions (e.g., one for each separation or colorant) are made based on the results of the threshold comparison.

Alternatively, preparing 138 to print a representation of the color described in the color designation information can include processing the contone values according to some form of error diffusion. Error diffusion distributes errors in lightness or darkness associated with marking decisions to neighboring picture elements. In standard error diffusion techniques, this distribution of error can result in fragmented dots. Such fragmentation may be desirable in covert communication applications wherein adding to the complexity of the decoding process is desirable. Rank order based error diffusion minimizes such fragmentation and tends to form compact dots in a rendered or printed version of an image. Accordingly, preparing 138 to print a representation of the color described in the color designation information according to rank order error diffusion may improve a decodability of the encoded information.

In applications where difficulty in decoding is desirable, the selection 126 and association 130 of a given color description may be unrelated to, or randomly selected from, the recipe selections 126 and associations 130 for any other color description.

In other embodiments, it may be desirable for a given encoded information state to be associated with a given colorant selection strategy independent of the particular color described in the color designation information received 118 regarding an element of the image. For example, a first encoded information state may always be associated with colorant recipes that include 80% of a maximum possible amount of the additional colorant and a second encoded information state may always be associated with a colorant recipe that includes 50% of a maximum possible amount of the additional colorant.

Referring to FIG. 2, a portion of a document processing system or system portion 210 includes a printer model 214 of an associated printer (e.g., 218). The associated printer (e.g., 218) includes a standard, typical, common or customary subtractive primary colorant applicator 222 and an augmenting colorant applicator 226. The augmenting colorant applicator 226 augments 114 the available colorant set with an additional colorant. In some embodiments, the primary 222 and augmenting 226 colorant applicators are separate devices. In other embodiments, a single applicator is adapted to perform both the functions of a primary colorant applicator and augmenting a colorant applicator.

The document processing system 210 also includes an image data receiver 230, an iso-color locus determiner 234, an iso-color recipe selector 238, a watermark receiver 242 and a rendering module 246. Some embodiments include the associated printer (e.g., 218).

The image data receiver 230 can be operative to receive 118 color designation information regarding an element of an image. For example, the image data receiver receives an image file or portion thereof from a computer storage medium such as a hard drive, memory card, floppy disk, optical disk or computer communication network. The image data receiver 230 may deliver, or make available, to the iso-color locus determiner 234 color designation information regarding one or more elements of an image described in the image file.

The iso-color locus determine 234 may be operative to determine 122 an iso-color locus of colorant recipes for rendering colors described in the color designation information regarding the one or more elements of the image. For instance, the iso-color locus determiner 234 processes color description information through the printer model 214 or through colorant selection functions (CSFs) or through one or more inverse printer models derived therefrom, to determine or predict colorant recipes for representing the colors described in the color designation information. As indicated above, the determination 122 of iso-color recipes can included a pre-calculation and storage of colorant recipes for a number of pre-selected colors according to pre-selected (126) colorant selection functions (CSFs) or sets of constraints. Accordingly, the iso-color locus determiner 234 may be operative to make those pre-calculations and store their results. In such embodiments, the iso-color locus determiner 234 may be operative to determine 122 the iso-color locus by accessing and/or processing the stored information. For example, the iso-color locus determiner 234 may be operative to access LUTs or other data structures to retrieve colorant recipes and/or to interpolate between colorant recipes stored in the data structures. Where an iso-color locus is determined 122 to include at least two different colorant recipes and wherein at least one of those colorant recipes calls for at least some of at least one of an available augmenting colorant, the system or system portion 210 may provide a watermark or encode information in the associated image element even if the image element does not include a significant or usable neutral component.

Accordingly, where a sufficient number of colorant recipes are available for a given described color, the iso-color recipe selector 238 is operative to select 126 the sufficient number of recipes (i.e., at least two). To provide the watermark without relying on a neutral component of the color, the selector 238 selects at least one of the iso-color colorant recipes that specifies a non-zero amount of at least one of the at least one additional colorant and associates 130 the respective selected recipes with a respective number of encoded information states. The associated 130 encoded information states may be used as an index or address for accessing the respective associated recipe.

The selection 126 and associations 130 may be random (or pseudo random) or otherwise unrelated to selections 126 associated with different color descriptions. Alternatively, the selections 126 and associations 130 may be based on a recipe selection strategy, policy, constraint or rule that is applied consistently from color to color.

For instance, individual recipe selections 126 and associations 130 may be recorded by the recipe selector 238 and delivered to a decoding station, device or system. If the decoding system is able to examine a printed version of the image and determine for a given image element which color (or colors) is (are) associated with the image element and which recipe (or recipes) was (were) used in rendering the element, the decoding station or system can use the color and recipe information and the delivered selection 126 information to determine the information encoded in the image element.

Alternatively, where the iso-color recipe selector 238 selects 126 recipes and associates 130 the selected recipes with encoded state information based on consistent rules or constraints independent of the particular color in question, the decoding station would only require information regarding the colorant selection and strategies, constraints or rules and information regarding respective encoded state information associated 130 with each colorant selection function, strategy or constraint, to decode the information in a printed version of the image.

The watermark receiver 242 may be operative to receive state information to be encoded in a printed version of the element or elements of the image. For example, the watermark receiver 242 receives data in association with image element positions. For example, the data may represent binary states associated with pixel positions of a binary watermark such as a text message or line drawing. Alternatively, the data may represent encoded information, such as, for example, binary information of a data glyph. In other embodiments, more than two binary states are encoded in each image element. For example, 2, 3, 4 or more bits of information are encoded in the colorant recipe selection 126 when, for example, 3, 4, 8, 16 or more colorant recipes are selected 126 and associated 130 with encoded state information.

The rendering module 246 is operative to prepare to print a representation of the color described in the color designation information of the element or elements of the image according to the colorant recipe addressed by the information received 134 by the watermark receiver 242 and image element data received by the image data receiver 230. For example, the rendering module 246 receives selected colorant recipes and associated 130 encoded state information from the iso-color recipe selector 238 and watermark or encoded data information from the watermark receiver 242. The rendering module 246 uses the watermark or encoded data information and image element color description data to address or index a colorant recipe. The rendering module 246 then processes the colorant recipe to generate data for controlling a marking engine (e.g., 218).

For example, the watermark information addresses a colorant recipe or set of contone values associated with amounts of colorant. For example, the watermark information addresses, identifies or selects a LUT or other data structure that includes data from which the colorant recipe or contone values can be calculated based on the image element color description data. The rendering module 246 uses spatial position information regarding the element or elements of the image being processed to access threshold information associated with one or more halftone screens. The contone values are compared to respective halftone screen thresholds and marking decisions (i.e., to place a dot of colorant or not) are made based on the results of the comparison.

Alternatively, the rendering module 246 processes the contone values of the colorant recipe selected by the watermark data through an error diffusion process. Rank order error diffusion tends to produce clustered dots or halftone structures while many other error diffusion techniques can generate fragmented dots. Accordingly, rendering or preparing 138 to print a representation of the color according to rank order error diffusion may make it easier to decode the encoded information. Preparing 138 to print a representation of the color based on other forms of error diffusion may add to the security and/or decoding difficulty of the encoded information.

The printer (e.g., 218) may be any type of colorant recipe-based printer or marking engine.

In electrophotographic or xerographic devices, the primary colorant applicator 222 is a set of one or more black and/or cyan, magenta and yellow developers which make clouds of toners available to be electrostatically attracted to portions of an imaging member or photo-receptor. The augmenting colorant applicator 226 is one or more additional developer which provides clouds of one or more additional toners.

In inkjet-based devices, the applicators 222, 226 include one or more print heads for spraying customary or extended set inks on print media, such as paper.

In offset printing presses, rollers and/or plates are used as the applicators 222, 226.

The various functional blocks (230, 234, 238, 242 and 246) of the system or system portion 210 may be implemented in various combinations of hardware and software. The printer model 214 may be provided as a lookup table, linked list, database, parameterized functions or other data or analytical forms stored in or associated with various storage mediums including fixed or removable memories, fixed or removable hard drivers, floppy disks, optical disks and/or via a network connection. Additionally, the various functions of the functional blocks can be provided in other architectures or arrangements. The arrangement shown is illustrative only.

It will be appreciated that various of the above-disclosed and other features and functions, or alternatives thereof, may be desirably combined into many other different systems or applications. While elements have been described in particular orders, some operations can occur in alternative different sequences. Some operations can divided into sub-operations that are performed at different times. Various presently unforeseen or unanticipated alternatives, modifications, variations or improvements therein may be subsequently made by those skilled in the art which are also intended to be encompassed by the following claims.

The phrase "document processing system," as used herein, encompasses any apparatus, such as a digital copier, book making machine, facsimile machine, printer, multi-function machine, etc., which performs a print outputting function for any purpose.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for providing a watermark in an image, thereby transforming the image into a watermarked image, the method comprising:
   augmenting an available customary subtractive primary colorant set with at least one additional extended set colorant, thereby providing an augmented colorant set;
   receiving color designation information regarding an element of the image;
   determining, by an iso-color locus determiner, an iso-color locus of colorant recipes for rendering a color described in the color designation information wherein at least one of the colorant recipes in the locus of colorant recipes calls for a non-zero amount of at least one of the at least one additional colorant;
   selecting at least two of the determined iso-color colorant recipes, wherein at least one of the selected determined iso-color colorant recipes specifies a non-zero amount of at least one of the at least one additional colorant;
   associating the at least two selected recipes with at least two respective encoded information states, thereby establishing an address for each selected recipe;
   receiving state information to be encoded in a printed version of the element of the image; and
   preparing to print a representation of the color described in the color designation information of the element of the image according to the colorant recipe addressed by the received state information, wherein the color designation information of the element of the image is transformed into an element of the watermarked image printable by an associated printer using the augmented colorant set as the printed version of the element of the image.

2. The method of claim 1 wherein augmenting the available customary subtractive primary colorant set comprises one of:
   augmenting a set of colorants consisting of standard subtractive cyan, magenta, yellow and black colorants;
   augmenting a set of colorants consisting of standard subtractive cyan, magenta, and yellow colorants; and
   augmenting a colorant set consisting of a standard subtractive black colorant.

3. The method of claim 1 wherein selecting at least two of the determined iso-color colorant recipes comprises:
   selecting at least two of the determined iso-color colorant recipes wherein each of the selected determined iso-color colorant recipes specifies a non-zero amount of at least one of the at least one additional colorant.

4. The method of claim 1 wherein selecting at least two of the determined iso-color colorant recipes comprises:
   selecting at least two of the determined iso-color colorant recipes wherein at least one of the selected determined iso-color colorant recipes specifies a relatively low amount of at least one of the at least one additional colorant, and wherein at least one other of the selected determined iso-color colorant recipes specifies a relatively higher amount of the at least one of the at least one additional colorant, thereby providing for a watermark that can be decoded based on differences in a fine spatial texture.

5. The method of claim 1 wherein augmenting the available colorant set comprises:
augmenting the available colorant set with at least one spectrally extended set colorant.

6. The method of claim 1 wherein augmenting the available colorant set comprises:
augmenting the available colorant set with at least one of a low load cyan, magenta, yellow and black colorant.

7. The method of claim 1 wherein augmenting the available colorant set comprises:
augmenting the available colorant set with at least one hi-fi color colorant.

8. The method of claim 1 wherein augmenting the available colorant set comprises:
augmenting the available colorant set with at least one of an orange, red, green, blue, violet and fluorescent colorant.

9. The method of claim 1 wherein selecting at least two of the determined iso-color colorant recipes comprises:
selecting at least two colorant recipes that are optimally separated in colorant color space.

10. The method of claim 1 wherein preparing to print the representation of the color described in the color designation information of the element comprises:
processing the colorant recipe addressed by the received state information through at least one of an augmented set of halftone screens and a form of error diffusion.

11. The method of claim 1 wherein determining the iso-color locus of colorant recipes comprises:
pre-determining a plurality of colorant selection functions, each colorant selection function being based on at least one unique colorant selection strategy or constraint that distinguishes the colorant selection function from the other colorant selection functions of the plurality;
pre-calculating colorant recipes for selected colors according to each of the pre-determined colorant selection functions;
pre-storing the pre-calculated colorant recipes;
accessing selected ones of the pre-calculated colorant recipes; and
interpolating between the selected ones of the pre-calculated colorant recipes, thereby determining at least one member of the iso-color locus of colorant recipes.

12. A document processing system, the system comprising:
at least one printer model regarding a designated printer, wherein the designated printer includes:
at least one primary colorant applicator that is operative to apply at least a standard subtractive primary colorant set;
at least one augmenting colorant applicator that is operative to apply at least one additional extended set colorant beyond the standard subtractive primary colorant set, wherein the at least one primary colorant applicator may also serve as the at least one augmenting colorant applicator;
an image data receiver that is operative to receive color designation information regarding an element of an image;
an iso-color locus determiner that is operative to determine an iso-color locus of colorant recipes for rendering a color described in the color designation information wherein at least one of the colorant recipes in the locus of colorant recipes calls for a non-zero amount of at least one of the at least one additional colorant;
an iso-color recipe selector that is operative to select at least two of the determined iso-color colorant recipes, wherein at least one of the selected determined iso-color colorant recipes specifies a non-zero amount of at least one of the at least one additional colorant and to associate the at least two selected recipes with at least two respective encoded information states, thereby establishing an address for each selected recipe;
a watermark receiver that is operative to receive state information to be encoded in a rendered version of the element of the image; and
a rendering module that is operative to prepare to print a representation of the color described in the color designation information of the element of the image according to the colorant recipe addressed by the received state information.

13. The document processing system of claim 12 wherein the at least one primary colorant applicator is operative to apply at least one of a set of colorants consisting of standard subtractive cyan, magenta, yellow and black colorants, a set of colorants consisting of standard subtractive cyan, magenta, and yellow colorants; and a colorant set consisting of a standard subtractive black colorant.

14. The document processing system of claim 12 wherein the iso-color locus determiner is operative to determine an iso-color locus of colorant recipes for rendering the color described in the color designation information by accessing at least one printer model describing a color production behavior of the document processing system, processing the color described by the color designation information through the at least one printer model and evaluating the results of processing the color described by the color designation information through the at least one printer model to determine a) if there are at least two valid colorant recipes for producing the color described by the color designation information with the document processing system and if it is determined that there are at least two valid colorant recipes for producing the color described by the color designation information with the document processing system b) if at least one of the colorant recipes in the locus of colorant recipes calls for a non-zero amount of at least one of the at least one additional colorant.

15. The document processing system of claim 12 wherein the iso-color locus determiner is operative to determine an iso-color locus of colorant recipes for rendering the color described in the color designation information by accessing a plurality of colorant selection functions, each respective member of the plurality of colorant selection functions being based on a respective set of colorant selection constraints, processing the color described by the color designation information through the plurality of colorant selection functions and evaluating the results of processing the color described by the color designation information through the plurality of colorant selection functions to determine a) if there are at least two valid colorant recipes for producing the color described by the color designation information with the document processing system and if it is determined that there are at least two valid colorant recipes for producing the color described by the color designation information with the document processing system b) if at least one of the colorant recipes in the locus of colorant recipes calls for a non-zero amount of at least one of the at least one additional colorant.

16. The system of claim 12 wherein the iso-color selector is operative to select at least two of the determined iso-color colorant recipes wherein each of the selected determined iso-color colorant recipes specifies a non-zero amount of at least one of the at least one additional colorant.

17. The system of claim 12 wherein the iso-color selector is operative to select at least two of the determined iso-color colorant wherein at least one of the selected determined iso-color colorant recipes specifies a relatively low amount of at least one of the at least one additional colorant, and wherein at least one other of the selected determined iso-color colorant recipes specifies a relatively higher amount of the at least one of the at least one additional colorant, thereby providing for a watermark that can be decoded based on differences in a fine spatial texture.

18. The system of claim 12 wherein the at least one augmenting colorant applicator is operative to apply at least one spectrally extended set colorant.

19. The system of claim 12 wherein the at least one augmenting colorant applicator is operative to apply at least one of a low load cyan, magenta, yellow and black colorant, a hi-fi color colorant, an orange, a red colorant, a green colorant, a blue colorant, a violet colorant and a fluorescent colorant.

20. The system of claim 12 wherein the iso-color selector is operative to select at least two colorant recipes that are optimally separated in colorant color space.

21. The system of claim 12 further comprising the designated printer wherein the designated printer comprises at least one of:

an electrophotographic marking engine wherein the at least one primary colorant applicator and the at least one augmenting colorant applicator comprise a plurality of electro-photographic developers for providing a plurality of toners;

an inkjet marking engine wherein the at least one primary colorant applicator and the at least one augmenting colorant applicator comprise at least one inkjet print head that is operative to deposit a plurality of inks on a print medium; and an offset press wherein the at least one primary colorant applicator and the at least one augmenting colorant applicator comprise a plurality of offset printing plates that are operative to receive and transfer a respective plurality of inks.

* * * * *